D. W. Rawson,
Animal Tether.
Nº 70,899. Patented Nov. 12, 1867.
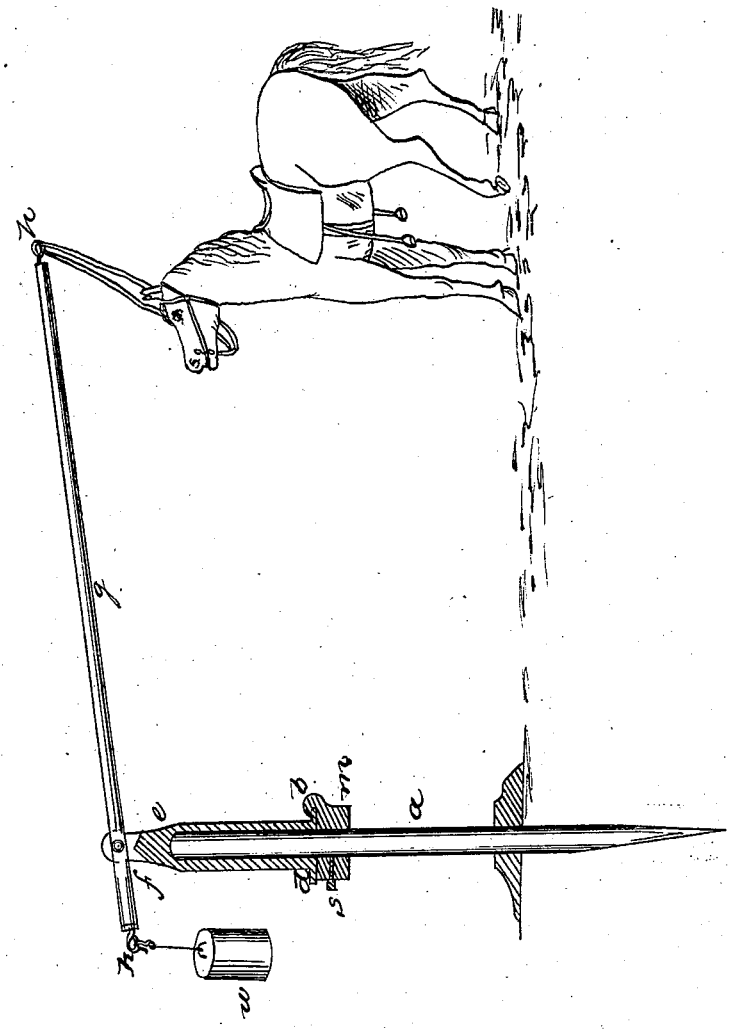
Witnesses
W. H. Halley
A. F. Howard
Inventor
David W. Rawson.

United States Patent Office.

DAVID W. RAWSON, OF CROYDON, NEW HAMPSHIRE.

Letters Patent No. 70,899, dated November 12, 1867.

IMPROVEMENT IN APPARATUS FOR TETHERING ANIMALS.

The Schedule referred to in these Letters Patent and making part of the same.

TO ALL WHOM IT MAY CONCERN:

Be it known that I, DAVID W. RAWSON, of Croydon, in the county of Sullivan, and State of New Hampshire, have invented a new and improved Apparatus for Tethering Animals; and I do hereby declare that the following is a full and exact description thereof, reference being had to the accompanying drawings, and to the letters of reference marked thereon.

In the drawing, $a$ represents the bar or stake on which the tether is hung. On this stake is placed the cylindrical cap or socket $c$, made of metal or other suitable material, terminating at the upper extremity with the two arms $f$, and at the lower extremity with the flange $d$. Below this cap is the hollow cylinder or band $m$, made of metal or other material, and held firmly in place by the clamp-screw $s$. This band is made with one or more hooks $b$, forming a groove, within which the flange $d$, at the lower extremity of the cap, turns freely, thus effectually securing and holding the tether upon the bar or stake at all times, though the latter should lean to one side, or otherwise be misplaced, and at the same time permitting the cap to turn freely.

The bar $g$ is attached to the arms of the cap by a centre-pin, so as to move in a vertical plane. The animal is tethered at $h$, and the weight $w$ hung upon the bar or pole at $k$, keeps the long arm of the pole from falling, and, by moderately pulling, prevents the animal from becoming entangled in the cord or whatever it may be tethered by, and at the same time gives the animal freedom to walk or graze about the tether-stake.

This arrangement makes a useful, economical, and durable tether.

What I claim as my invention, and desire to secure by Letters Patent, is—

The band $m$, with the hook or hooks $b$, and the flange $d$ on the cap $c$, to be applied to any tether in which a cap or socket turning on an upright stake or bar is used.

DAVID W. RAWSON.

Witnesses:
    W. H. H. ALLEN,
    A. F. HOWARD.